United States Patent
Jo et al.

(10) Patent No.: US 12,418,026 B2
(45) Date of Patent: *Sep. 16, 2025

(54) POSITIVE ELECTRODE ACTIVE MATERIAL FOR LITHIUM RECHARGEABLE BATTERY, METHOD OF PRODUCING THE SAME, AND LITHIUM RECHARGEABLE BATTERY INCLUDING THE SAME

(71) Applicant: LG Energy Solution, Ltd., Seoul (KR)

(72) Inventors: Chi Ho Jo, Daejeon (KR); Hyuck Hur, Daejeon (KR); Seul Ki Kim, Daejeon (KR); Wang Mo Jung, Daejeon (KR); Gi Beom Han, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/077,316

(22) Filed: Mar. 12, 2025

(65) Prior Publication Data

US 2025/0210653 A1 Jun. 26, 2025

Related U.S. Application Data

(63) Continuation of application No. 17/719,536, filed on Apr. 13, 2022, which is a continuation of application (Continued)

(30) Foreign Application Priority Data

Aug. 24, 2018 (KR) .................. 10-2018-0099115

(51) Int. Cl.
H01M 4/525 (2010.01)
H01M 4/36 (2006.01)
(Continued)

(52) U.S. Cl.
CPC .......... *H01M 4/525* (2013.01); *H01M 4/366* (2013.01); *H01M 4/46* (2013.01);
(Continued)

(58) Field of Classification Search
CPC ........ H01M 4/366; H01M 4/36; H01M 4/545; H01M 10/0525
See application file for complete search history.

(56) References Cited

U.S. PATENT DOCUMENTS 7,462,422 B2   12/2008   Hosoya
9,979,014 B2   5/2018    Kim et al.
(Continued)

FOREIGN PATENT DOCUMENTS

JP    2001291507 A    10/2001
KR    100515029 B1    9/2005
(Continued)

OTHER PUBLICATIONS

Qi et al., "CoO/NiSix core-shell nanowire arrays as lithium-ion anodes with high rate capabilities", Nanoscale 2012, 4, 991-996.*

*Primary Examiner* — Kenneth J Douyette
(74) *Attorney, Agent, or Firm* — Lerner David LLP

(57) ABSTRACT

A surface of a $LiCoO_2$-based positive electrode active material to have a rock salt crystal structure is provided. Specifically, a positive electrode active material for a lithium rechargeable battery is provided, including: a core particle containing lithium cobalt oxide doped with aluminum (Al); and a coating layer positioned on a surface of the core particle and containing a cobalt (Co)-based compound having a rock salt crystal structure. A method of producing the positive electrode active material is also provided using a solid-phase method. The positive electrode active material can be applied to a positive electrode, lithium rechargeable battery, battery module, battery pack, and the like.

12 Claims, 6 Drawing Sheets

Related U.S. Application Data

No. 16/549,545, filed on Aug. 23, 2019, now Pat. No. 11,342,557.

(51) Int. Cl.
  *H01M 4/46* (2006.01)
  *H01M 10/0525* (2010.01)
  *H01M 4/02* (2006.01)

(52) U.S. Cl.
  CPC .. *H01M 10/0525* (2013.01); *H01M 2004/021* (2013.01); *H01M 2004/028* (2013.01)

(56) References Cited

U.S. PATENT DOCUMENTS

| | | |
|---|---|---|
| 2006/0063070 A1 | 3/2006 | Chiga et al. |
| 2011/0200857 A1 | 8/2011 | Kaga et al. |
| 2015/0016024 A1 | 1/2015 | Choi et al. |
| 2016/0190577 A1 | 6/2016 | Thackeray et al. |
| 2016/0315320 A1 | 10/2016 | Matsuda |
| 2017/0309910 A1 | 10/2017 | Jo et al. |
| 2017/0372710 A1 | 12/2017 | Zhang et al. |
| 2018/0062173 A1 | 3/2018 | Jo et al. |

FOREIGN PATENT DOCUMENTS

| | | |
|---|---|---|
| KR | 101497946 B1 | 3/2015 |
| KR | 101762508 B1 | 7/2017 |
| KR | 101785265 B1 | 10/2017 |
| KR | 20170120645 A | 10/2017 |
| KR | 20180025652 A | 3/2018 |

\* cited by examiner

POSITIVE ELECTRODE ACTIVE MATERIAL FOR LITHIUM RECHARGEABLE BATTERY, METHOD OF PRODUCING THE SAME, AND LITHIUM RECHARGEABLE BATTERY INCLUDING THE SAME

CROSS-REFERENCE TO RELATED APPLICATION

The present application is a continuation of U.S. application Ser. No. 17/719,536, now U.S. Pat. No. 12,334,554, filed on Apr. 13, 2022, which is a continuation of U.S. application Ser. No. 16/549,545, now U.S. Pat. No. 11,342,557, filed on Aug. 23, 2019, which claims priority to and the benefit of Korean Patent Application No. 10-2018-0099115 filed in the Korean Intellectual Property Office on Aug. 24, 2018, the entire contents of which are incorporated herein by reference.

BACKGROUND OF THE INVENTION (a) Field of the Invention

The present invention relates to a positive electrode active material for a lithium rechargeable battery, a method of producing the same, and a lithium rechargeable battery including the same.

(b) Description of the Related Art

In recent years, the demand for a large-capacity power storage device as well as a small electronic device has increased significantly. In accordance with the demand, there is a growing interest in an electrochemical device exhibiting a high capacity and high power.

In this regards, attempts have been made to increase a capacity of a lithium rechargeable battery by making a charge voltage thereof higher than that of a commercial lithium rechargeable battery having a charge and discharge region of 3.0 to 4.2 V.

Specifically, a positive electrode active material is a component by which the capacity of the lithium rechargeable battery is implemented. As a positive electrode active material, lithium cobalt oxide ($LiCoO_2$, so-called "LCO") is applied to the commercial lithium rechargeable battery.

$LiCoO_2$ is a compound having a layered crystal structure, and the battery has a high rolling density and relatively excellent electrochemical characteristics such as cycle characteristics and the like when using $LiCoO_2$.

Since $LiCoO_2$ is a compound having a low charge and discharge current amount of about 150 mAh/g, in a case where a charge voltage of higher than 4.2 V is applied to a battery to which $LiCoO_2$ is applied, a crystal structure of the $LiCoO_2$ becomes unstable and $Co^{3+}$ ions are eluted from the inside of the battery. Accordingly, a side reaction between the eluted $Co^{3+}$ ions and an electrolyte occurs on a surface of the $LiCoO_2$, resulting in deterioration of the battery lifespan.

Therefore, in order to implement a lithium rechargeable battery exhibiting a high capacity and high power and having stability, a positive electrode active material should be improved in advance.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a technology of modifying a surface of a $LiCoO_2$-based positive electrode active material to have a rock salt crystal structure.

An exemplary embodiment of the present invention provides a positive electrode active material for a lithium rechargeable battery, including: a core particle containing lithium cobalt oxide doped with aluminum (Al); and a coating layer positioned on a surface of the core particle and containing a cobalt(Co)-based compound having a rock salt crystal structure.

Another exemplary embodiment of the present invention provides a method of producing the positive electrode active material of the embodiment described above using a solid-phase method.

Yet another exemplary embodiment of the present invention provides various examples (positive electrode, lithium rechargeable battery, battery module, battery pack, and the like) of applying the positive electrode active material of the embodiment described above.

Hereinafter, embodiments of the present invention will be described in detail. However, the embodiments are only provided by way of example, and the present invention is not limited thereto, but may be defined by the scope of the appended claims.

In addition, in the specification, a particle diameter D0.9 indicates a particle diameter when active material particles with various particle diameter distributions of 0.1, 0.2, 0.3, . . . , 3, 5, 7, . . . , 10, 20, and 30 μm are accumulated up to 0.9% at a volume ratio, D10 indicates a particle diameter when the active material particles are accumulated up to 10% at a volume ratio, D50 indicates a particle diameter when the active material particles are accumulated up to 50% at a volume ratio, D6 indicates a particle diameter when the active material particles are accumulated up to 6% at a volume ratio, and D95 indicates a particle diameter when the active material particles are accumulated up to 95% at a volume ratio.

Hereinafter, embodiments of the present invention will be described in detail. However, the embodiments are only provided by way of example, and the present invention is not limited thereto, but may be defined by the scope of the appended claims.

Positive Electrode Active Material

In an embodiment of the present invention, a lithium cobalt oxide particle whose surface is modified to have a rock salt crystal structure is provided as a positive electrode active material.

Problems of Commercial $LiCoO_2$

As pointed out above, the theoretical capacity of $LiCoO_2$ is about 275 mAh/g, and a capacity of the $LiCoO_2$ when using 4.2 V as an upper limit voltage is about 150 mAh/g. In a case where the upper limit voltage is increased to 4.4 V in order to increase the capacity, battery performance is significantly reduced due to a structure change of the $LiCoO_2$. In order to solve the problem, doping is performed to prevent the structure change, such that the battery performance is significantly improved and a 4.4 V battery is recently in mass production.

Meanwhile, in order to increase an electrode density for increasing a capacity of a battery, $LiCoO_2$ with a small particle diameter (D50 particle diameter of about 5 to 10 μm)

applied to a commercial lithium rechargeable battery may be replaced with $LiCoO_2$ with a large particle diameter (D50 particle diameter of about 12 to 25 μm) or a positive electrode active material having a form in which $LiCoO_2$ with a small particle diameter and $LiCoO_2$ with a large particle diameter are mixed (so-called "a bimodal form") may be applicable to a lithium rechargeable battery.

However, since the kinetic characteristics of $LiCoO_2$ with a large particle diameter are inferior to that of $LiCoO_2$ with a small particle diameter, a lithium (Li) deficient layer may be artificially formed in a partial area of a surface of the $LiCoO_2$ with a large particle diameter so as to improve the kinetic characteristics of the $LiCoO_2$ with a large particle diameter to the level of the $LiCoO_2$ with a small particle diameter.

Here, a general crystal structure of $LiCoO_2$ is a layered structure regardless of a particle diameter. However, in the Li deficient layer, the crystal structure is changed into a spinel structure similar to $LiMn_2O_4$ depending on a change in Li/Co molar ratio.

Such a Li deficient layer is uniformly formed from the surface of the $LiCoO_2$ with a large particle diameter up to a certain depth, such that a core having a layered structure and a shell having a spinel structure may be obtained. Meanwhile, a layered structure and a spinel structure are formed to be mixed from the surface of the $LiCoO_2$ with a large particle diameter up to a certain depth, such that a core having a layered structure and a shell having both a layered structure and a spinel structure may be obtained.

In a case where a Li deficient layer is artificially formed in a partial area of a surface of $LiCoO_2$ with a large particle diameter into any form, the kinetic characteristics thereof may be improved to the level of $LiCoO_2$ with a small particle diameter, and even in a case where a charge voltage of 4.4 V is applied to a battery to which the above $LiCoO_2$ is applied, an elution of internal metal (Co) may not occur.

In accordance with the continuous demand for increase in capacity of a battery, a cell has been developed according to the demand for 4.45 V and 4.5 V batteries. However, as an upper limit voltage is increased, surface stability of $LiCoO_2$ is reduced and Co is thus eluted. The eluted Co is deposited on a negative electrode surface, resulting in degradation of the battery performance. In particular, it is confirmed that the Co elution amount is rapidly increased as the voltage of the battery is increased to 4.45 V or 4.5 V from 4.4 V. Accordingly, since a new concept of $LiCoO_2$ is required for 4.45 V and 4.5V batteries, a method of improving battery performance by reducing an elution of Co is suggested.

Note that when the charge voltage is about 4.45 V or higher, internal metal (Co) is eluted even in a state where a Li deficient layer is artificially formed in a partial area of a surface of $LiCoO_2$ with a large particle diameter. That is, the spinel structure present in the partial area of the surface of $LiCoO_2$ with a large particle diameter also becomes unstable at the charge voltage of about 4.45 V or higher, which causes the same problems as the existing $LiCoO_2$ with a small particle diameter.

Surface Modification by Rock Salt Crystal Structure

In an embodiment of the present invention, a surface of lithium cobalt oxide doped with Al is modified to have a rock salt crystal structure and the surface-modified lithium cobalt oxide is provided as a positive electrode active material of the embodiment, the elution of internal metal (Co) may not occur even in a case where a charge voltage of higher than 4.2 V, 4.4 V or higher, or further 4.45 V or higher is applied to a lithium rechargeable battery to which the positive electrode active material is applied regardless of a particle diameter of $LiCoO_2$.

More specifically, the positive electrode active material of the embodiment includes a core particle containing lithium cobalt oxide doped with Al; and a coating layer positioned on a surface of the core particle and containing a cobalt-based compound having a rock salt crystal structure.

The coating layer further contains cobalt, lithium cobalt oxide, or a combination thereof.

Here, the rock salt crystal structure may maintain surface structure stability thereof even in a case where a charge voltage of higher than 4.2 V, 4.4 V or higher, or further 4.45 V or higher is applied. Specifically, cobalt(II) oxide (CoO) which is a cobalt-based compound may be selected as a compound having a rock salt crystal structure.

This is because cobalt(II) oxide has a low reactivity with an electrolyte as compared to $Al_2O_3$ well known as a coating agent for a surface of $LiCoO_2$ and improves the surface stability, such that the elution of Co is reduced. Specifically, when using an upper limited voltage of 4.4 V, the battery performance may be improved by performing a surface coating with $Al_2O_3$, but it is difficult to expect the surface stability with only $Al_2O_3$ coating when using an upper limited voltage of 4.45 V or higher.

Meanwhile, the core particle contains lithium cobalt oxide doped with Al, and Al may serve to stabilize a crystal (lattice) structure of the lithium cobalt oxide and prevent a structure change at a high voltage. The structure of the lithium cobalt oxide may be further stabilized by using Al as compared with the case of using other dopants. In a case where the lithium cobalt oxide in the core particle is not doped with Al, in spite of the presence of the surface modification (that is, the coating layer) by the rock salt crystal structure, the crystal (lattice) structure of the lithium cobalt oxide may be collapsed at a voltage of 4.4 V to 4.5 V.

In other words, it is possible to maintain a more solid and stable structure of the positive electrode active material of the embodiment at a high voltage by a synergistic effect between Al doped on the lithium cobalt oxide in the core particle and the surface modification (that is, the coating layer) by the rock salt crystal structure.

The coating layer containing the cobalt-based compound having a rock salt crystal structure may be obtained by mixing tricobalt tetraoxide ($Co_3O_4$), cobalt(II) hydroxide ($Co(OH)_2$), or a cobalt raw material containing a mixture thereof with an object to be coated (that is, the core particle) and performing calcination, as described later.

In the calcination process, a phase change of the cobalt raw material and a coating of cobalt(II) oxide (CoO) formed by the phase change may be simultaneously performed. In addition, the phase change of the cobalt raw material may be performed in a state where the surface of the core particle is coated with the cobalt raw material, and the coating may be performed after the phase change is performed in advance. However, in a case where the calcination is performed in a state in which the cobalt raw material and the core particle are mixed in a powder form, the phase change and the coating may be simultaneously performed in multiple times, such that it is difficult to distinguish the order of the phase change and the coating. In this sense, it may be considered that the phase change and the coating are simultaneously performed.

More specifically, a phase of the cobalt raw material may be changed into the cobalt(II) oxide (CoO) having a rock salt crystal structure. The surface of the core particle may be coated with the phase-changed cobalt(II) oxide (CoO). Metal cobalt which is an inevitable impurity contained in the cobalt raw material or lithium cobalt oxide produced by a reaction of the cobalt(II) oxide with the surface of the core particle may be also coated together, but the present invention is not limited thereto.

The coating layer formed by using the solid-phase method may have an island form in which the surface of the core particle is coated with the cobalt-based compound having a rock salt crystal structure. That is, the cobalt(II) oxide having a rock salt crystal structure may be coated in a particle form.

Characteristics of a production method will be described later. Hereinafter, components constituting the positive electrode active material of the embodiment will be described in more detail.

Weight Ratio of Core Particle to Coating Layer, Thickness of Coating Layer, and D50 Particle Diameter of Core Particle In the positive electrode active material of the embodiment, a weight ratio (core particle:coating layer) of the core particle to the coating layer may be 1,000:0.2 to 1,000:10, and specifically 1,000:0.5 to 1,000:2. That is a content of the coating layer may be 200 to 10,000 ppm, and specifically 500 to 2,000 ppm based on 1 kg of the core particles. Within the content range, the inside of the coating layer is effectively protected by the rock salt crystal structure thereof, such that the elution of internal metal (Co) and the side reaction with the electrolyte may be suppressed, but the present invention is not limited thereto.

Meanwhile, a D50 particle diameter of the core particle may be 12 to 25 μm, and specifically 15 to 20 μm, and in this case, the core particle may correspond to the LiCoO$_2$ with a large particle diameter described above.

In consideration of the D50 particle diameter of the core particle and the weight ratio of the core particle to the coating layer, a thickness of the coating layer may be in a range of 1 to 50 nm, and specifically 2 to 20 nm. Such a thickness of the coating layer may be derived from a comprehensive consideration of the D50 particle diameter of the core particle (12 to 25 μm) which is an absolute numerical value, and the weight ratio of the core particle to the coating layer, the weight ratio being 1,000:0.2 to 1,000:10, and specifically 1,000:0.5 to 1,000:2 and a relative concept with respect to the D50 particle diameter.

Meanwhile, the core particle may be one obtained by artificially forming a Li deficient layer in a partial area of a surface of LiCoO$_2$ with a large particle diameter as described above.

In this case, the core particle may have a first region in which a crystal structure of the lithium cobalt oxide is a layered structure; and a second region in which a crystal structure of the lithium cobalt oxide is a spinel structure or a mixed structure of a spinel structure and a layered structure from an interface with the first region to a surface of the core particle.

Here, the first region may be represented by the following Formula 1 and the second region may be represented by the following Formula 2.

[Formula 1]

[Formula 2]

(M1 and M2 each independently are one selected from the group consisting of Ti, Mg, Zr, Ba, Ca, Ta, Nb, and Mo; and a, x, y, z, and m are values satisfying 0.95≤a≤1.05, 0<x≤0.02, 0≤y≤0.02, 0≤z≤0.02, and 0<m<0.75, respectively.)

A difference between Formulas 1 and 2 is a Li/Co molar ratio, a Li/Co molar ratio in Formula 1 is a/(1−x−y−z) and a Li/Co molar ratio in Formula 2 is (a−m)/(1−x−y−z). That is, the difference of the Li/Co molar ratios between Formulas 1 and 2 means that the second region is a lithium deficient layer.

In each of Formulas 1 and 2, each of Al, M1, and M2 corresponds to a dopant which is substituted in the cobalt site in the crystal (lattice) structure of the lithium cobalt oxide. In addition, x, y, and z each mean a doping amount of each Al, M1, and M2. In a case of introducing the dopant, the crystal (lattice) structure of the lithium cobalt oxide forming the first region and the second region may be stabilized and the structure change at a high voltage may be prevented.

In particular, in each of Formulas 1 and 2, 0<x≤0.02 means that Al is essentially doped in each of the first region and the second region. As described above, the structure of the lithium cobalt oxide may be further stabilized by using Al as compared with the case of using other dopants. In a case where the first region and the second region are not doped with Al, in spite of the presence of the coating layer, the crystal (lattice) structure of the lithium cobalt oxide may be collapsed at a voltage of 4.4 V to 4.5 V.

In each of Formulas 1 and 2, one of M1 and M2 may be Ti, the other one of M1 and M2 may be Mg, 0<y≤0.02 and 0≤z≤0.02, 0≤y≤0.02 and 0<z≤0.02, or 0<y≤0.02 and 0<z≤0.02. This means that at least one of Ti and Mg may be co-doped together with Al. As such, in the case where at least one of Ti and Mg is co-doped together with Al, structure stabilization and resistance reduction effects may be further improved as compared to the case of doping only Al. In particular, growth of the core particle is suppressed by Ti, such that a size of a single crystal becomes small, which contributes to reducing a battery resistance and extending the lifespan of the battery. In addition, Mg is an element capable of implementing a so-called pillar effect and may contribute to further stabilizing the crystal structure of the core particle. Accordingly, in the case where at least one of Ti and Mg is co-doped together with Al, it may be advantageous to improve electrochemical characteristics of a battery, as compared to the case where the core particle is doped with only Al.

In the case of doping only Al, the doping amount of Al may be 1,000 to 8,000 ppm, and specifically 2,000 to 6,000 ppm based on based on 1 kg of the core particles. In the case of co-doping at least one of Ti and Mg together Al, the doping amount of Al may be 1,000 to 4,000 ppm, the doping amount of Ti or Mg may be 400 to 1,500 ppm, and specifically 500 to 1,000 ppm, based on 1 kg of the core particles.

Regardless of whether only Al is doped or at least one of Ti and Mg is co-doped together with Al, in the case of using a core particle obtained by artificially forming a Li deficient layer in a partial area of a surface of LiCoO$_2$ with a large particle diameter doped with Al, the kinetic characteristics thereof may be improved, and even in a case where a charge voltage of 4.4 V is applied to a battery to which the core particle is applied, an elution of internal metal (Co) may not occur.

Furthermore, in a case where a core particle obtained by artificially forming a Li deficient layer in a partial area of a surface of LiCoO$_2$ with a large particle diameter doped with Al is used, a dopant is introduced into the core particle, and a surface of the core particle is modified to have the rock salt crystal structure, a strong synergistic effect appears. Therefore, even in a case where a charge voltage of higher than 4.2 V, 4.4 V or higher, or further 4.45 V or higher is applied, an elution of internal metal (Co) is further suppressed, which may possible to implement a lithium rechargeable battery exhibiting a high capacity and high power and having stability.

Co Elution Suppression Characteristics (Parameter)

When a battery is stored at a temperature range of 50 to 80° C. for one week and then discharged at a voltage of 4.4 V, actually, the Co elution amount per 1 g of the positive electrode active material may be 100 to 200 ppm/g, and specifically 130 to 160 ppm/g.

In addition, when a battery is stored at a temperature of 60° C. for one week and then discharged at a voltage of 4.5 V, the Co elution amount per 1 g of the positive electrode active material may be 1,500 to 2,500 ppm/g, and specifically 1,800 to 2,200 ppm/g.

This fact means that the Co elution amount is significantly reduced at each voltage as compared to a case of a bare core particle whose surface has not been modified to have the rock salt crystal structure, and is supported by experimental examples described later.

Here, the Co elution amount may be measured as follows. In order to reduce measurement errors, the amount of positive electrode mixture material loaded per surface area of an electrode is set to be 60 to 80 mg/cm$^2$ by increasing the loaded amount than that when producing a general electrode, and the electrode charged within a range of 4.4 V to 4.5 V is prepared and then put into a Nalgene bottle together with a 4 ml electrolyte. The Nalgene bottle is completely sealed with a parafilm and an aluminum pouch so as to prevent evaporation of the electrolyte. The completely sealed bottle is stored in a chamber at 60° C. for one week. After one week, for extracting only the electrolyte, the positive electrode active material which may be present in the electrolyte as a floating matter is completely removed by using a sealing sheet as a filter. The electrolyte is evaporated to quantify the amount of Co present, that is, eluted in the electrolyte through inductively coupled plasma (ICP). The Co elution amount is calculated by dividing the weight of Co of which quantification is confirmed by the weight of LiCoO$_2$ positive electrode active material of the electrode impregnated with the electrolyte at the beginning. Note that this is merely an example and the present invention is not limited thereto.

Method of Producing Positive Electrode Active Material

In another embodiment of the present invention, there is provided a method of producing the positive electrode active material of the embodiment using the solid-phase method.

It is possible to obtain a positive electrode active material having a surface modified in an island form by using the solid-phase method as described above. On the other hand, in a case of using a gas dispersion method, a wet method, and the like, the surface of the positive electrode active material is modified in a film form or a form in which a film form and an island form are mixed, such that the surface of the positive electrode active material is effectively passivated and surface reactivity with the electrolyte may be thus effectively reduced, as compared with the surface modification of the island form.

Specifically, the method of producing the embodiment may include mixing a core particle containing lithium cobalt oxide with tricobalt tetraoxide (Co$_3$O$_4$), cobalt(II) hydroxide (Co(OH)$_2$), or a cobalt raw material containing a mixture thereof; and calcining the mixture of the cobalt raw material and the core particle containing the lithium cobalt oxide doped with Al.

In the mixing of the cobalt raw material with the core particle, a weight ratio (core particle:cobalt raw material) of the core particle to the cobalt raw material may be 1,000:0.2 to 1,000:10, and specifically 1,000:0.5 to 1,000:2. That is, a content of the cobalt raw material may be 200 to 10,000 ppm, and specifically 500 to 2,000 ppm based on 1 kg of the core particles, and in this case, the weight ratio of core particle:coating layer may be satisfied as described above.

Although mixing conditions such as time, a speed, a temperature, a device, and the like are not particularly limited in the mixing of the cobalt raw material with the core particle, the cobalt raw material and the core particle may be put into a mixer to stir the mixture for 5 minutes to 30 minutes at room temperature and 800 to 1,200 rpm.

As the mixer, a paste mixer may be used as the examples described later, but is not limited thereto, and a mixer usually used in the art when solid phase mixing may be used.

Thereafter, in the calcining of the mixture of the cobalt raw material and the core particle, the crystal structure of the core particle is not changed, but a phase of the cobalt raw material is changed into a cobalt-based compound having a rock salt crystal structure and a surface of the core particle may be coated with the cobalt-based compound having a rock salt crystal structure.

To this end, the mixture of the cobalt raw material and the core particle may be calcined at a calcination temperature of 800 to 1,200° C. for 2 to 10 hours. More specifically, the calcination is started from a temperature of 900 to 1,000° C., and the calcination temperature is raised at a heating rate of 3 to 5° C./min for 2 to 6 hours, and then may be maintained at the reached temperature for 3 to 5 hours. Note that this is merely an example and the present invention is not limited thereto.

Meanwhile, when the weight ratio of the core particle to the cobalt raw material (core particle:cobalt raw material) is 1,000:0.2 to 1,000:10, and specifically 1,000:0.5 to 1,000:2, a coating layer having a thickness of 1 to 40 nm, and specifically 2 to 20 nm may be formed on the surface of the core particle containing the lithium cobalt oxide. The description thereof is as described above and a detailed description thereof will thus be omitted.

An example of the core particle may include a core particle having: a first region in which a crystal structure of the lithium cobalt oxide doped with Al is a layered structure; and a second region in which a crystal structure of the lithium cobalt oxide doped with Al is a spinel structure or a mixed structure of a spinel structure and a layered structure from an interface with the first region to a surface of the core particle. A commercial core particle may be used and a directly produced core particle may be used. The latter may be produced by using methods of examples described later or a method well known in the art. Since the present invention is not limited to a method of producing the core particle, a detailed description thereof will be omitted.

In yet another embodiment of the present invention, there is provided various examples (positive electrode, lithium rechargeable battery, battery module, battery pack, and the like) of applying the positive electrode active material.

The lithium rechargeable battery according to the embodiment includes: an electrode assembly including a positive electrode, a negative electrode facing the positive electrode, a separator disposed between the positive electrode and the negative electrode, and an electrolyte with which the positive electrode, the negative electrode, and the separator are impregnated; a battery container accommodating the electrode assembly; and a sealing member sealing the battery container.

The positive electrode includes a positive electrode current collector and a positive electrode active material layer formed on the positive electrode current collector, and the positive electrode active material layer includes the positive electrode active material described above. Accordingly, the electrochemical device may exhibit high capacity and high power characteristics, as well as excellent thermal stability and lifespan characteristics.

The negative electrode includes a negative electrode current collector and a negative active material layer formed on the negative electrode current collector, and the negative active material layer includes a negative active material.

Examples of the negative active material include a material capable of reversibly intercalating/deintercalating lithium ions, a lithium metal, a lithium metal alloy, a material capable of doping and dedoping lithium, or a transition metal oxide.

The material capable of reversibly intercalating/deintercalating lithium ions is a carbon material, may be any generally-used carbon-based negative active material in a lithium rechargeable battery, and representative examples thereof may include crystalline carbon, amorphous carbon, or a combination thereof. Examples of the crystalline carbon may include a graphite such as a shapeless graphite, a sheet-shaped graphite, a flake-shaped graphite, a spherical-shaped graphite, or a fiber-shaped natural graphite or artificial graphite, and examples of the amorphous carbon may include soft carbon (low temperature calcined carbon), hard carbon, mesophase pitch carbide, calcined cokes, and the like.

The lithium metal alloy may be an alloy of lithium and a metal of Na, K, Rb, Cs, Fr, Be, Mg, Ca, Sr, Si, Sb, Pb, In, Zn, Ba, Ra, Ge, Al, or Sn.

Examples of the material capable of doping and dedoping lithium may include Si, $SiO_x$ (0<x<2), a Si—C composite, a Si-Q alloy (wherein Q is an alkali metal, an alkaline earth metal, Group 13 to 16 elements, a transition metal, a rare earth element, or a combination thereof, and not Si), Sn, $SnO_2$, Sn—C composite, Sn—R (wherein R is an alkali metal, an alkaline earth metal, Group 13 to 16 elements, a transition metal, a rare earth element, or a combination thereof, and not Sn), and the like. Examples of specific elements of Q and R may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Example of the transition metal oxide may include vanadium oxide, lithium vanadium oxide, and the like.

The negative active material layer further includes a binder and may optionally further include a conductive material.

The binder serves to bond negative active material particles with one another well and bond the negative active material to the current collector well. Representative examples of the binder may include polyvinyl alcohol, carboxymethyl cellulose, hydroxypropyl cellulose, polyvinyl chloride, carboxylated polyvinyl chloride, polyvinyl fluoride, an ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, nylon, and the like, but are not limited thereto.

The conductive material is used for imparting electrical conductivity to an electrode. Any conductive material may be used as long as it is an electrically conductive material without causing a chemical change. Examples of the conductive material may include a carbon-based material such as natural graphite, artificial graphite, carbon black, acetylene black, Ketjen black, carbon fiber, and the like; a metal-based material such as metal powder or metal fiber of copper, nickel, aluminum, silver, and the like; a conductive polymer such as a polyphenylene derivative and the like; or mixture thereof.

Examples of the current collector may include a copper foil, a nickel foil, a stainless steel foil, a titanium foil, a nickel foam, a copper foam, a polymer substrate coated with a conductive metal, or a combination thereof.

The electrolyte includes a non-aqueous organic solvent and lithium salt.

The non-aqueous organic solvent serves as a medium through which ions involved in electrochemical reaction of a battery may migrate.

Examples of the non-aqueous organic solvent may include a carbonate-based solvent, an ester-based solvent, an ether-based solvent, a ketone-based solvent, an alcohol-based solvent, or an aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, 1,1-dimethylethyl acetate, methyl propionate, ethyl propionate, γ-butyrolactone, decanolide, valerolactone, mevalonolactone, caprolactone, and the like. Examples of the ether-based solvent may include dibutyl ether, tetraglyme, diglyme, dimethoxyethane, 2-methyl tetrahydrofuran, tetrahydrofuran, and the like. Examples of the ketone-based solvent may include cyclohexanone and the like. In addition, examples of the alcohol-based solvent may include ethyl alcohol, isopropyl alcohol, and the like. Examples of the aprotic solvent may include nitriles such as R—CN (wherein R is a C2 to C20 linear, branched, or cyclic hydrocarbon group, and may include a double bond, an aromatic ring, or an ether bond), amides such as dimethylformamide, dioxolanes such as 1,3-dioxolane, sulfolanes, and the like.

The non-aqueous organic solvent may be used alone or in a mixture. When the non-aqueous organic solvent is used in a mixture, a mixture ratio thereof may be adjusted depending on desired battery performance, which may be widely understood by those skilled in the art.

In addition, the carbonate-based solvent may be used by mixing cyclic carbonate with chain carbonate. In this case, the cyclic carbonate and the chain carbonate may be mixed with each other at a volume ratio of about 1:1 to about 1:9, which may enhance electrolyte performance.

The non-aqueous organic solvent may be obtained by further adding an aromatic hydrocarbon-based organic solvent to the carbonate-based solvent. In this case, the carbonate-based solvent and the aromatic hydrocarbon-based organic solvent may be mixed with each other at a volume ratio of about 1:1 to about 30:1.

The non-aqueous electrolyte may further include a vinylene carbonate-based or ethylene carbonate-based compound to extend a battery lifespan.

Representative examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, vinylene ethylene carbonate, and the like. In a case where the vinylene carbonate-based or ethylene carbonate-based compound is further used, the amount thereof may be properly adjusted to extend the battery lifespan.

The lithium salt is dissolved in the non-aqueous organic solvent, supplies lithium ions in the battery, facilitates the basic operation of the lithium rechargeable battery, and promotes lithium ion migration between the positive and negative electrodes. Representative examples of the lithium salt include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers), LiCl, LiI, $LiB(C_2O_4)_2$, lithium bis(oxalato) borate (LiBOB), or combination thereof, which is used as a supporting electrolytic salt. The lithium salt is preferably used in a concentration of about 0.1 M to about 2.0 M. When the concentration of the lithium salt falls within the above range, an electrolyte has proper conductivity and viscosity, such that excellent electrolyte performance may be exhibited and lithium ions may effectively migrate.

The separator separates a negative electrode and a positive electrode from each other and supplies a migration path for lithium ions and any separator may be used as long as it is and usually used in a lithium battery. That is, a separator having a low resistance with respect to migration of ions in an electrolyte and an excellent electrolyte-retaining ability. Examples of the separator are glass fiber, polyester, Teflon, polyethylene, polypropylene, polytetrafluoroethylene (PTFE), and a combination thereof, each of which may be a non-woven or woven fabric. For example, a separator formed of a polyolefin (such as polyethylene, polypropylene, or the like)-based polymer, may be mainly used for a lithium ion battery. In order to ensure thermal resistance or mechanical strength, a coated separator including a ceramic component or a polymer material may be used, and the separator may have a mono-layered or multi-layered structure.

The lithium rechargeable battery of the embodiment may not only used for a unit cell used as a power source of a small-sized device but also be used for a unit battery used in a middle and large sized battery module including a plurality of battery cells. Furthermore, the battery modules may constitute a battery pack.

According to the embodiments of the present invention, the lithium rechargeable battery exhibiting a high capacity and high power and having stability may be implemented.

DETAILED DESCRIPTION OF THE EMBODIMENTS

Figure 1:
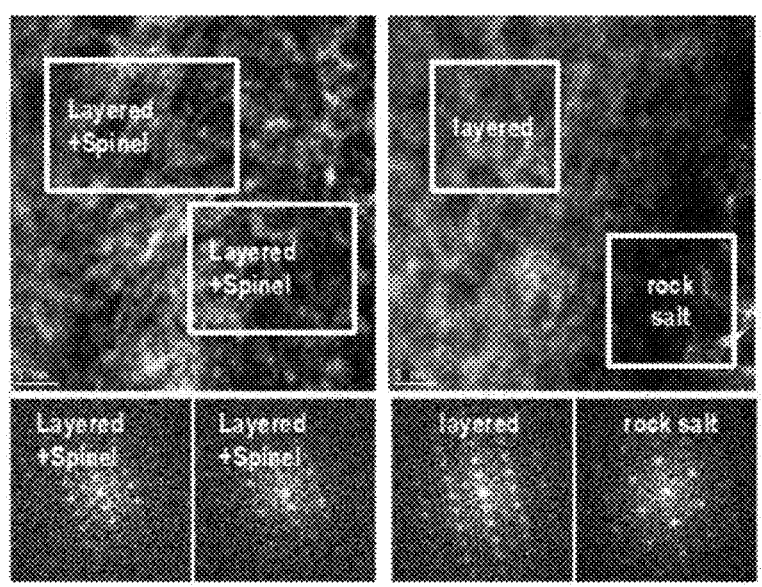
FIG. 1 shows photographs obtained by observing each of positive electrode active materials in Example 1 and Comparative Example 3 with a field emission scanning electron microscope (FE-TEM) and a transmission electron microscope (TEM).

Hereinafter, preferred examples of the present invention, comparative examples, and experimental examples for evaluating them will be described. However, the following examples are merely preferred examples of the present invention, and the present invention is not limited to the following examples.

Example 1 (LCO with Large Particle Diameter Whose Surface is Modified with CoO by Solid-Phase Method, Only Al Doping)

(1) Production of Positive Electrode Active Material
1) Production of Core Particle A dry mixture of an Al doping raw material ($Al(OH)_3$) $Co_3O_4$) and $Li_2CO_3$ was calcined in a furnace at 1,050° C. for 8 hours to form a lithium cobalt oxide ($LiCo_{0.98}Al_{0.02}O_2$) particle doped with Al. A molar ratio of Li:Co in $Co_3O_4$ and $Li_2CO_3$ of the dry mixture was 1:1, and $Al(OH)_3$ was 2 g with respect to the total amount (500 g) of $Co_3O_4$ and $Li_2CO_3$.

Thereafter, a first region was formed by the lithium cobalt oxide ($LiCo_{0.98}Al_{0.02}O_2$) particle doped with Al. In order to form a lithium deficient layer doped with Al on an outer surface of the first region, an Al doping raw material, $Co_3O_4$, and $Li_2CO_3$ were further added to the furnace and dry-mixed, and then the mixture was calcined at 800° C. for 6 hours. In the added materials when forming the second region, a molar ratio of Li:Co in $Co_3O_4$ and $Li_2CO_3$ was 0.3:1, and the Al doping raw material was 0.87 g with respect to the total amount (500 g) of $Co_3O_4$ and $Li_2CO_3$.

Therefore, a core particle having the second region with a thickness of 20 nm formed on the surface of the first region ($LiCoO_2$) could be obtained (D50 of the entire core particles: 18 μm).

2) Formation of Coating Layer 0.5 g of $Co_3O_4$ powder was mixed with 500 g of the core particle doped with only Al and the mixture was calcined at 950° C. for 4 hours to obtain a positive electrode active material in which a CoO coating layer having a thickness of 20 nm is formed on the surface of the core particle.

(2) Production of Lithium Rechargeable Battery

A positive electrode was produced using the positive electrode active material of Example 1 and a negative electrode was separately produced, and then they were assembled into a battery in accordance with a method commonly known in the art.

1) Production of Positive Electrode

Specifically, the positive electrode active material of Example 1 was used, carbon black was used as a conductive material, and polyvinylidene fluoride (PVdF) was used as a binder. They were mixed in a weight ratio of 96:2:2 (positive electrode active material:conductive material:binder) an N-methylpyrrolidone (NMP) solvent was used, thereby producing positive electrode slurry.

The produced positive electrode slurry was applied onto a surface of an aluminum foil having a thickness of 20 μm in a loading amount of 15 g/cm², a positive electrode was produced by performing drying at 130° C. for 2 hours, and then roll pressing was performed.

2-1) Production of Negative Electrode (Applied to Coin Full Cell (CFC))

Natural graphite was used as a negative electrode active material, carbon black was used as a conductive material, and styrene-butadiene rubber (SBR) was used as a binder. They were mixed in a weight ratio of 96:2:2 (negative electrode active material:conductive material:binder) to produce negative electrode slurry.

The produced negative electrode slurry was applied onto a copper foil, a negative electrode was produced by performing vacuum drying at 60° C. for 12 hours, and then roll pressing was performed.

2-2) Reference Electrode (Applied to Coin Half Cell (CHC))

A lithium (Li) metal foil having a thickness of 300 μm was used as a reference electrode.

3-1) Assembly of Battery (Coin Full Cell (CFC))

The positive electrode and the negative electrode were used, a polyethylene separator (thickness of 12 μm, manufactured by Celgard LLC) was used as a separator, and an electrolyte (1 mole of lithium hexafluorophosphate (LiPF$_6$), ethylene carbonate (EC)/dimethyl carbonate (DMC)=1/1 volume ratio) was injected to produce a coin full cell type lithium rechargeable battery.

3-2) Assembly of Battery (Coin Half Cell (CHC))

A coin half cell type lithium rechargeable battery was produced in the same manner as in 3-1) above, except that the produced positive electrode was used as a working electrode and the Li metal foil having a thickness of 300 μm was used as a reference electrode.

It should be noted that descriptions omitted in the production of positive electrode, the production of negative electrode, and the assembly of battery are in accordance with a method commonly known in the art.

Example 2 (LCO with Large Particle Diameter Whose Surface is Modified with CoO by Solid-Phase Method and LCO Bulk Co-Doped with Al and Ti)

(1) Production of Positive Electrode Active Material
1) Production of Core Particle A dry mixture of an Al doping raw material (Al(OH)$_3$), a Ti doping raw material (TiO$_2$), Co$_3$O$_4$, and Li$_2$CO$_3$ were calcined in a furnace at 1,050° C. for 8 hours to form a lithium cobalt oxide (LiCo$_{0.983}$Al$_{0.015}$Ti$_{0.002}$O$_2$) particle co-doped with Al and Ti. A molar ratio of Li:Co in Co$_3$O$_4$ and Li$_2$CO$_3$ of the dry mixture was 1:1. The Al doping raw material was 0.87 g and the Ti doping raw material was 0.28 g, with respect to the total amount (500 g) of Co$_3$O$_4$ and Li$_2$CO$_3$.

Thereafter, a first region was formed by the lithium cobalt oxide (LiCo$_{0.983}$Al$_{0.015}$Ti$_{0.002}$O$_2$) particle co-doped with Al and Ti. In order to form a lithium deficient layer co-doped with Al and Ti on an outer surface of the first region, an Al doping raw material, a Ti doping raw material, Co$_3$O$_4$, and Li$_2$CO$_3$ were further added to the furnace and dry-mixed, and then the mixture was calcined at 800° C. for 6 hours. In the added materials when forming the second region, a molar ratio of Li:Co in Co$_3$O$_4$ and Li$_2$CO$_3$ was 0.3:1, and the Al doping raw material was 0.87 g and the Ti doping raw material was 0.28 g, with respect to the total amount (500 g) of Co$_3$O$_4$ and Li$_2$CO$_3$.

Therefore, a core particle having the second region having a thickness of 20 nm formed on the surface of the first region (LiCoO$_2$) could be obtained (D50 of the entire core particles: 18 μm).

2) Formation of Coating Layer

A positive electrode active material in which a CoO coating layer with a thickness of 20 nm is formed on a surface of a core particle was obtained in the same manner as in Example 1, except for using the core particle co-doped with Al and Ti instead of the core particle doped with only Al of Example 1.

(2) Production of Lithium Rechargeable Battery

A positive electrode and a lithium rechargeable battery were produced in the same manner as in Example 1 except for using the positive electrode active material of Example 2 instead of the positive electrode active material of Example 1.

Example 3 (LCO with Large Particle Diameter Whose Surface is Modified with CoO by Solid-Phase Method and LCO Bulk Co-Doped with Al and Mg)

(1) Production of Positive Electrode Active Material
1) Production of Core Particle A dry mixture of an Al doping raw material (Al(OH)$_3$), a Mg doping raw material (MgO), Co$_3$O$_4$, and Li$_2$CO$_3$ were calcined in a furnace at 1,050° C. for 8 hours to form a lithium cobalt oxide (LiCo$_{0.983}$Al$_{0.015}$Mg$_{0.002}$O$_2$) particle co-doped with Al and Mg. A molar ratio of Li:Co in Co$_3$O$_4$ and Li$_2$CO$_3$ of the dry mixture was 1:1. The Al doping raw material was 0.87 g and the Mg doping raw material was 0.28 g, with respect to the total amount (500 g) of Co$_3$O$_4$ and Li$_2$CO$_3$.

Thereafter, a first region was formed by the lithium cobalt oxide (LiCo$_{0.983}$Al$_{0.015}$Mg$_{0.002}$O$_2$) particle co-doped with Al and Mg. In order to form a lithium deficient layer co-doped with Al and Mg on an outer surface of the first region, an Al doping raw material, a Mg doping raw material, Co$_3$O$_4$, and Li$_2$CO$_3$ were further added to the furnace and dry-mixed, and then the mixture was calcined at 800° C. for 6 hours. In the added materials when forming the second region, a molar ratio of Li:Co in Co$_3$O$_4$ and Li$_2$CO$_3$ was 0.3:1, and the Al doping raw material was 0.87 g and the Mg doping raw material was 0.28 g, with respect to the total amount (500 g) of Co$_3$O$_4$ and Li$_2$CO$_3$.

Therefore, a core particle having the second region having a thickness of 20 nm formed on the surface of the first region (LiCoO$_2$) could be obtained (D50 of the entire core particles: 18 μm).

2) Formation of Coating Layer

A positive electrode active material in which a CoO coating layer with a thickness of 20 nm is formed on a surface of a core particle was obtained in the same manner as in Example 1, except for using the core particle co-doped with Al and Mg instead of the core particle doped with only Al of Example 1.

(2) Production of Lithium Rechargeable Battery

A positive electrode and a lithium rechargeable battery were produced in the same manner as in Example 1 except for using the positive electrode active material of Example 3 instead of the positive electrode active material of Example 1.

Example 4 (LCO with Large Particle Diameter Whose Surface is Modified with CoO by Solid-Phase Method and LCO Bulk Co-Doped with Al, Ti, and Mg)

(1) Production of Positive Electrode Active Material
1) Production of Core Particle A dry mixture of an Al doping raw material ($Al(OH)_3$), a Ti doping raw material ($TiO_2$), a Mg doping raw material (MgO), $Co_3O_4$, and $Li_2CO_3$ were calcined in a furnace at 1,050° C. for 8 hours to form a lithium cobalt oxide ($LiCo_{0.983}Al_{0.015}Mg_{0.001}Ti_{0.001}O_2$) particle co-doped with Al, Ti, and Mg. A molar ratio of Li:Co in $Co_3O_4$ and $Li_2CO_3$ of the dry mixture was 1:1. The Al doping raw material was 0.87 g, the Ti doping raw material was 0.14 g, and the Mg doping raw material was 0.14 g, with respect to the total amount (500 g) of $Co_3O_4$ and $Li_2CO_3$.

Thereafter, a first region was formed by the lithium cobalt oxide ($LiCo_{0.983}Al_{0.015}Mg_{0.001}Ti_{0.001}O_2$) particle co-doped with Al, Ti, and Mg. In order to form a lithium deficient layer co-doped with Al, Ti, and Mg on an outer surface of the first region, an Al doping raw material, a Ti doping raw material, a Mg doping raw material, $Co_3O_4$, and $Li_2CO_3$ were further added to the furnace and dry-mixed, and then the mixture was calcined at 800° C. for 6 hours. In the added materials when forming the second region, a molar ratio of Li:Co in $Co_3O_4$ and $Li_2CO_3$ was 0.3:1, and the Al doping raw material was 0.87 g, the Ti doping raw material was 0.14 g, and the Mg doping raw material was 0.14 g, with respect to the total amount (500 g) of $Co_3O_4$ and $Li_2CO_3$.

Therefore, a core particle having the second region having a thickness of 20 nm formed on the surface of the first region ($LiCoO_2$) could be obtained (D50 of the entire core particles: 18 μm).
2) Formation of Coating Layer A positive electrode active material in which a CoO coating layer with a thickness of 20 nm is formed on a surface of a core particle was obtained in the same manner as in Example 1, except for using the core particle co-doped with Al, Ti, and Mg instead of the core particle doped with only Al of Example 1.
(2) Production of Lithium Rechargeable Battery A positive electrode and a lithium rechargeable battery were produced in the same manner as in Example 1 except for using the positive electrode active material of Example 4 instead of the positive electrode active material of Example 1.

Comparative Example 1 (Bare, LCO With Large Particle Diameter Whose Surface Is Not Modified)

A lithium rechargeable battery was produced in the same manner as in Example 1 except for using the core particle of Example 1 itself as a positive electrode active material.

Comparative Example 2 (LCO With Large Particle Diameter Whose Surface is Modified With $Al_2O_3$ Using Gas Dispersion Method)

(1) Production of Positive Electrode Active Material
1) Production of Core Particle
The same core particle as in Example 1 was produced.
2) Formation of Coating Layer
An $Al_2O_3$ coating layer was formed on a surface of the core particle using a gas reactor.

(2) Production of Lithium Rechargeable Battery

A positive electrode and a lithium rechargeable battery were produced in the same manner as in Example 1 except for using the positive electrode active material of Comparative Example 2 instead of the positive electrode active material of Example 1.

Comparative Example 3 (LCO With Large Particle Diameter Whose Surface is Modified with $Al_2O_3$ Using Solid-Phase Method, Non-Bulk-Doped LCO)

(1) Production of Positive Electrode Active Material
1) Production of Core Particle A core particle having a second region ($Li_{0.3}CoO_2$) having a thickness of 20 to 300 nm formed on a surface of a first region ($LiCoO_2$) was obtained (D50 of the entire core particles: 18 μm) in the same manner Example 1, except that only an Al doping raw material ($Al(OH)_3$) was not used unlike Example 1.
2) Formation of Coating Layer 0.755 g of $Al_2O_3$ powder was mixed with 200 g of the core particle and the mixture was calcined at 450° C. for 4 hours to obtain a positive electrode active material in which an $Al_2O_3$ coating layer is formed on a surface of the core particle.
(2) Production of Lithium Rechargeable Battery A positive electrode and a lithium rechargeable battery were produced in the same manner as in Example 1 except for using the positive electrode active material of Comparative Example 3 instead of the positive electrode active material of Example 1.

Comparative Example 4 (LCO With Large Particle Diameter Whose Surface is Modified with CoO Using Solid-Phase Method, Non-Bulk-Doped LCO)

(1) Production of Positive Electrode Active Material

A positive electrode active material in which a CoO coating layer with a thickness of 20 nm is formed on a surface of a core particle was obtained in the same manner as in Example 1, except for using non-doped core particle instead of the core particle doped with only Al of Example 1.
(2) Production of Lithium Rechargeable Battery A positive electrode and a lithium rechargeable battery were produced in the same manner as in Example 1 except for using the positive electrode active material of Comparative Example 4 instead of the positive electrode active material of Example 1.

Experimental Example 1: Evaluation of Photograph by Field Emission Scanning Electron Microscope (FE-TEM) and Transmission Electron Microscope (TEM)

Each of the positive electrode active materials in Example 1 and Comparative Example 3 was photographed with a field emission scanning electron microscope (FE-TEM) and a transmission electron microscope (TEM), and the results are shown FIG. 1.

In FIG. 1, it is observed that in the case of the LCO with a large particle diameter whose surface is modified with $Al_2O_3$ by the solid-phase method (Comparative Example 3), a layered structure and a spinel structure are still mixed on a surface portion (coating layer) in spite of the surface modification.

On the other hand, it is observed in the case of LCO with a large particle diameter whose surface is modified with CoO by the solid-phase method (Example 1), in particular, a portion in which CoO is present has a rock salt crystal structure and a portion in which CoO is not present has a layered crystal structure. That is, the crystal structure is clearly distinguished by the presence or absence of CoO. This means that the crystal structure of the portion in which CoO is not present becomes a layered structure.

Experimental Example 2: Evaluation of Co Elution Amount and Gas Generation Amount after High Temperature Storage (1) Difference Evaluation Depending on Surface Modification Material and Method The high temperature storage characteristics of the positive electrode active materials of Example 1 and Comparative Examples 3 were evaluated. Evaluation items of the high temperature storage characteristics are a Co elution amount and a gas generation amount and an evaluation method for each item is as follows.

Co elution amount: The Co elution amount was measured as described above. Specifically, the amount of positive electrode mixture material loaded per surface area of an electrode was set to be 80 mg/cm$^2$, a positive electrode charged at 4.55 V was prepared and put into a Nalgene bottle together with a 4 ml electrolyte [EC:DMC=3:7, 2 wt % of VC]. The Nalgene bottle was completely sealed with a parafilm and an aluminum pouch so as to prevent evaporation of the electrolyte. The completely sealed bottle was stored in a chamber at 60° C. for one week. After one week, for extracting only the electrolyte, the positive electrode active material which may be present in the electrolyte as a floating matter was completely removed by using a sealing sheet as a filter. Thereafter, the electrolyte was evaporated to quantify the amount of Co present, that is, eluted in the electrolyte through inductively coupled plasma (ICP). Accordingly, the Co elution amount was calculated by dividing the weight of Co of which quantification was confirmed by the weight of the positive electrode active material of the charged electrode impregnated with the electrolyte at the beginning.

Gas generation amount: The amount of gas generated in each of lithium rechargeable batteries of Example 1 and Comparative Examples 1 to 3 was measured after 2 charge and discharge cycles under certain conditions of a drive voltage range of 4.4 to 4.5 V and 0.2 C/0.2 C.

Figure 2:
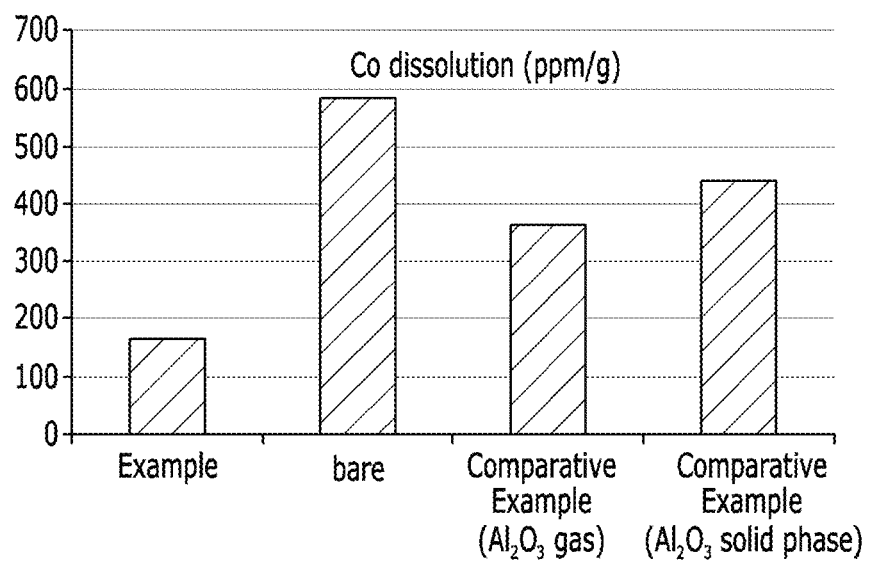
FIG. 2 is a graph showing the results obtained by measuring the amount of Co eluted in each of lithium rechargeable batteries of Example 1 and Comparative Examples 1 to 3 after 2 charge and discharge cycles under certain conditions.
Figure 3:
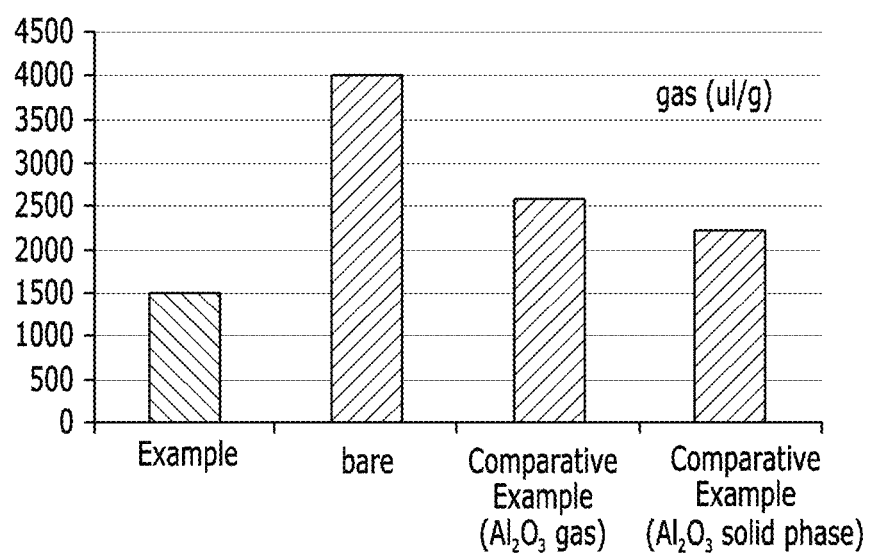
FIG. 3 is a graph showing the results obtained by measuring the amount of gas generated in each of lithium rechargeable batteries of Example 1 and Comparative Examples 1 to 3 after 2 charge and discharge cycles under certain conditions.

Referring to FIG. 2 (Co elution amount) and FIG. 3 (gas generation amount), it was confirmed that the Co elution amount and the gas generation amount of LCO with a large particle diameter whose surface is modified with CoO by the solid-phase method after the high temperature storage were significantly reduced, as compared to the LCO with a large particle diameter whose surface is not modified (bare, Comparative Example 1) and the LCO with a large particle diameter whose surface is modified with Al$_2$O$_3$ using the gas dispersion method (Comparative Example 2) or modified with Al$_2$O$_3$ using the solid-phase method (Comparative Example 3).

Specifically, it could be seen that the Co elution amount and the gas generation amount may be reduced by the surface modification itself regardless of a surface modification method or material, as compared to Comparative Examples 1 to 3.

However, since the surface modification of the rock salt phase may be modified with CoO unlike Al$_2$O$_3$, the Co elution amount and the gas generation amount in Example 1 were significantly reduced as compared to Comparative Examples 2 and 3. This means that the crystal structure of the rock salt phase is not easily changed even when high temperature storage.

(2) Difference Evaluation Depending on Whether or not Core Particle Doping is Performed Meanwhile, the Co elution amount and the gas generation amount of each of Examples 1 to 4 and Comparative Example 4 were evaluated.

Experimental Example 3: Electrochemical Characteristic Evaluation of Battery (1) Difference Evaluation Depending on Surface Modification Material and Method The electrochemical characteristics of each of the lithium rechargeable batteries produced in Example 1 and Comparative Examples 1 to 3 were evaluated using a charge and discharge device capable of controlling a constant current and a constant potential.

Figure 4:
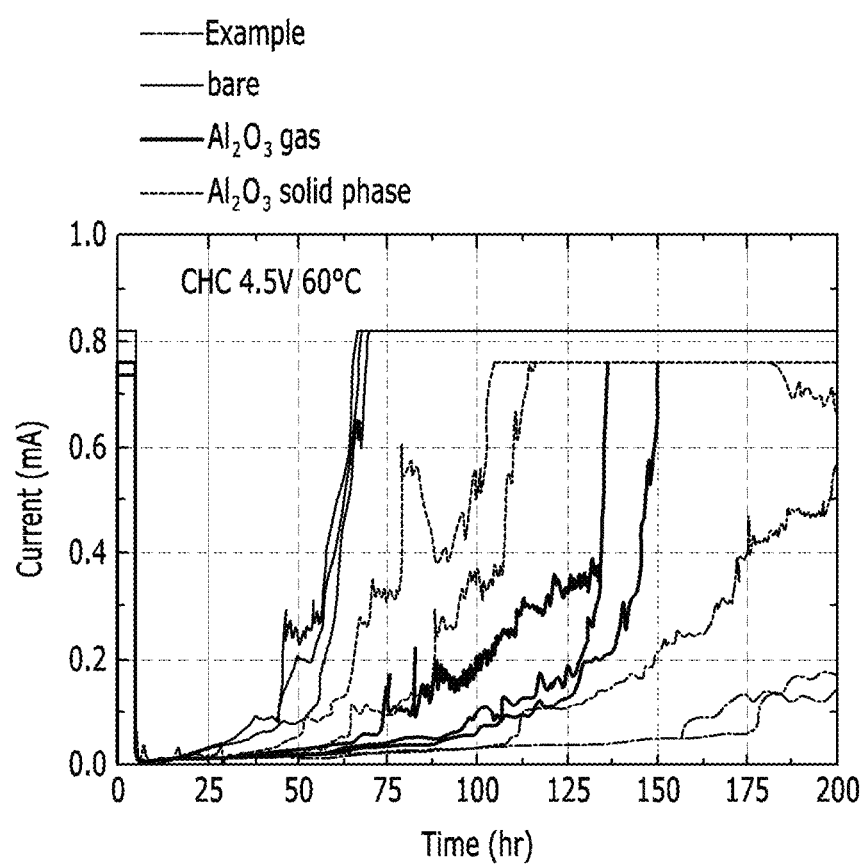
FIG. 4 is a graph showing the results obtained by evaluating electrochemical characteristics of each of lithium rechargeable batteries produced in Example 1 and Comparative Examples 1 to 3 after high temperature storage at 60° C.
Figure 5:
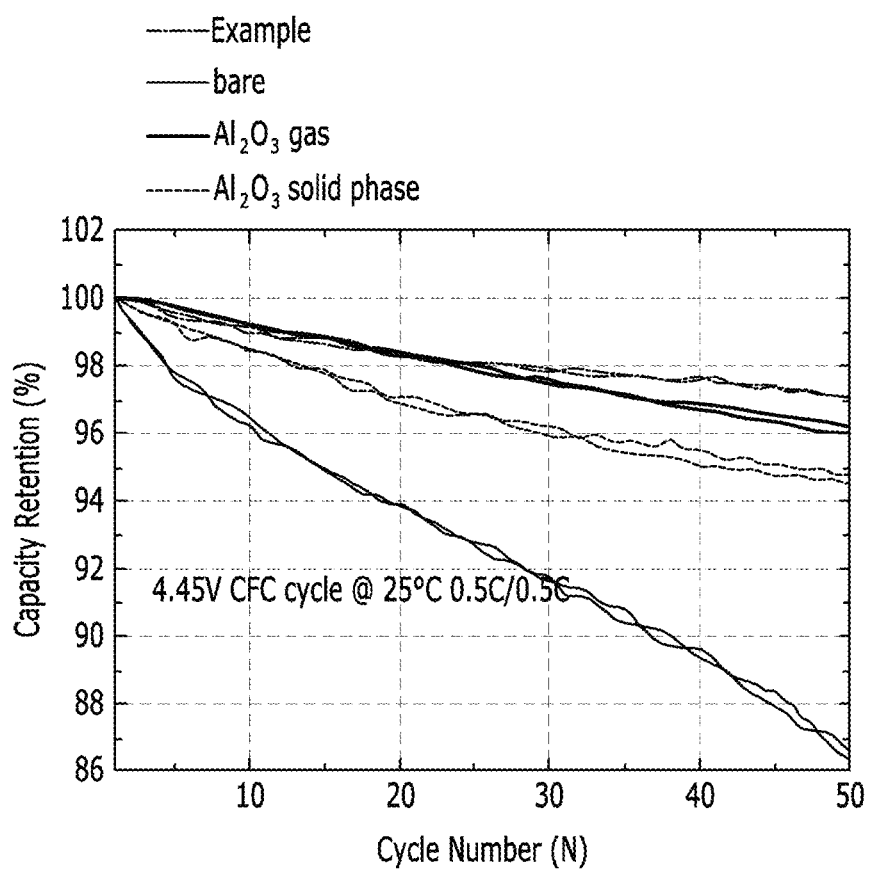
FIG. 5 is a graph showing the results obtained by evaluating electrochemical characteristics of each of lithium rechargeable batteries produced in Example 1 and Comparative Examples 1 to 3 at room temperature of 25° C.

Specifically, drive conditions of each lithium rechargeable battery are as follows.
1) Coin half cell evaluation after high temperature storage at 60° C. (FIG. 4)
Charge: 0.5 C, CC/CV, 4.5 V, 1/20 C cut-off
Discharge: 1.0 C, CC, 3.0 V, cut-off
2) Coin full cell evaluation at room temperature of 25° C. (FIG. 5)
Charge: 0.5 C, CC/CV, 4.45 V, 1/20 C cut-off
Discharge: 1.0 C, CC, 3.0 V, cut-off Referring to FIGS. 4 and 5, it can be confirmed that the capacity of the battery of Example 1 is maintained for the longest period of time by comparing the characteristics of the coin half cell after high temperature storage at 60° C. and the characteristics of the coin full cell at room temperature of 25° C.

By comprehensively evaluating these results with Experimental Examples 1 and 2, it can be seen that the Co elution amount and the gas generation amount may be reduced by the surface modification itself regardless of the surface modification method or material; however, in a case where CoO is selected as the surface modification material, rather than Al$_2$O$_3$, to modify the surface into a rock salt phase and coating (surface modification) the surface into a island form using the solid-phase method, rather than the gas dispersion method, as the surface modification method, the amount of Co eluted from the core particle is significantly reduced, such that a side reaction with the electrolyte is suppressed and the battery lifespan may be thus extended.

Figure 6:
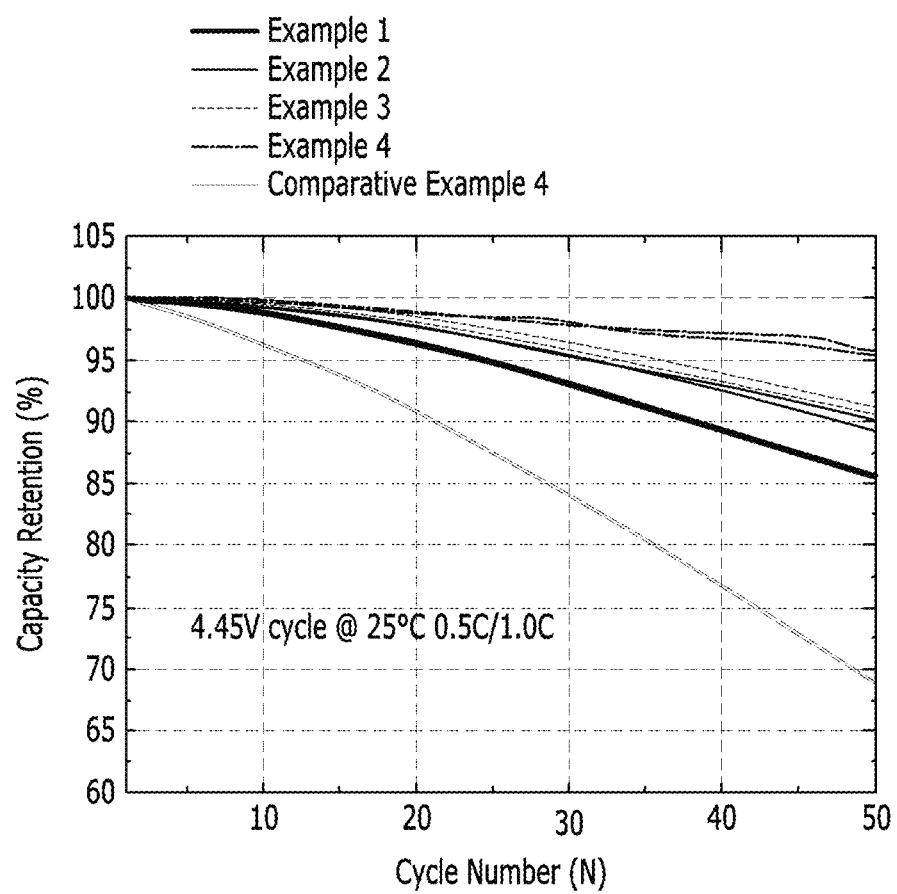
FIG. 6 is a graph showing the results obtained by evaluating electrochemical characteristics of each of lithium rechargeable batteries produced in Examples 1 to 4 and Comparative Example 4 to at room temperature of 25° C.

(2) Difference Evaluation Depending on Whether or not Core Particle Doping is Performed Meanwhile, the electrochemical characteristics of each of the lithium rechargeable batteries produced in Examples 1 to 4 and Comparative Example 4 were evaluated using a charge and discharge device capable of controlling a constant current and a constant potential (FIG. 6). The same evaluation conditions were set as the room temperature evaluation conditions.

Referring to FIG. 6, in a case where non-doped LCO with a large particle diameter is used as a core particle, it can be seen that a capacity retention of the battery is significantly reduced at a high voltage of 4.45 V even though the surface is modified with CoO (Comparative Example 4). On the other hand, in a case where LCO with a large particle diameter essentially doped with Al and further doped with Ti and/or Mg selectively is used as a core particle and the surface thereof is modified with CoO (Examples 1 to 4), it was confirmed that the capacity is maintained 85% or higher of the initial capacity after 50 cycles even at the high voltage of 4.45 V.

As a result, it could be seen that in a case where LCO with a large particle diameter is not doped with Al, in spite of the presence of the surface modification (that is, the coating layer) by the rock salt crystal structure of CoO, the crystal (lattice) structure of the LCO with a large particle diameter may be collapsed at a high voltage.

On the other hand, in a case where LCO with a large particle diameter is essentially doped with Al, the crystal structure of the LCO with a large particle diameter becomes more solid, and a more solid and stable structure may be maintained at a high voltage by a synergistic effect with the surface modification by the rock salt crystal structure of CoO.

Although embodiments of the present invention have been described in detail hereinabove, the scope of the present invention is not limited thereto, but may include several modifications and alterations made by those skilled in the art using a basic concept of the present invention as defined in the claims.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A positive electrode active material for a lithium rechargeable battery, comprising: a core particle comprising lithium cobalt oxide doped with aluminum (Al); and
    a coating layer on a surface of the core particle, wherein the coating layer comprises a cobalt-based compound having a rock salt crystal structure.

2. The positive electrode active material for a lithium rechargeable battery of claim 1, wherein:
    the cobalt-based compound having a rock salt crystal structure is cobalt (II) oxide.

3. The positive electrode active material for a lithium rechargeable battery of claim 1, wherein: the coating layer further comprises cobalt, lithium cobalt oxide, or a combination thereof.

4. The positive electrode active material for a lithium rechargeable battery of claim 1, wherein: the coating layer has an island form in which the surface of the core particle is coated with the cobalt-based compound having a rock salt crystal structure.

5. The positive electrode active material for a lithium rechargeable battery of claim 1, wherein: a weight ratio (core particle:coating layer) of the core particle to the coating layer is 1,000:0.2 to 1,000:10.

6. The positive electrode active material for a lithium rechargeable battery of claim 1, wherein: a thickness of the coating layer is 1 to 50 nm.

7. The positive electrode active material for a lithium rechargeable battery of claim 1, wherein: a D50 particle diameter of the coating particle is 12 to 25 μm.

8. The positive electrode active material for a lithium rechargeable battery of claim 7, wherein: the core particle comprises a region in which a crystal structure of the lithium cobalt oxide doped with Al is a layered structure.

9. The positive electrode active material for a lithium rechargeable battery of claim 8, wherein: the region is represented by the following Formula 1, $$Li_aCo_{(1-x-y-z)}Al_xM1_yM2_zO_2 \qquad [\text{Formula 1}]$$

wherein M1 and M2 are each independently one selected from the group consisting of Ti, Mg, Zr, Ba, Ca, Ta, Nb, and Mo, and a, x, y, and z are values satisfying $0.95 \le a \le 1.05$, $0 < x \le 0.02$, $0 \le y \le 0.02$, and $0 \le z \le 0.02$, respectively.

10. The positive electrode active material for a lithium rechargeable battery of claim 1, wherein: when the battery is stored at a temperature range of 50 to 80° C. for one week and then discharged at a voltage of 4.4 V, a Co elution amount per 1 g of the positive electrode active material is 100 to 200 ppm/g.

11. The positive electrode active material for a lithium rechargeable battery of claim 1, wherein: when the battery is stored at a temperature of 60° C. for one week and then discharged at a voltage of 4.5 V, a Co elution amount per 1 g of the positive electrode active material may be 1,500 to 2,500 ppm/g.

12. A lithium rechargeable battery, comprising:
    a positive electrode containing the positive electrode active material of claim 1;
    an electrolyte; and
    a negative electrode.

* * * * *